Figure 6:
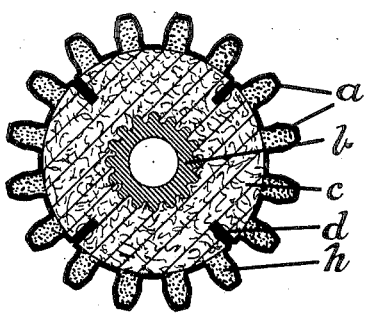

No. 820,789. PATENTED MAY 15, 1906.
F. HUTCHINS.
FLEXIBLE TOOTHED ELEMENT.
APPLICATION FILED OCT. 30, 1905.
2 SHEETS—SHEET 1.
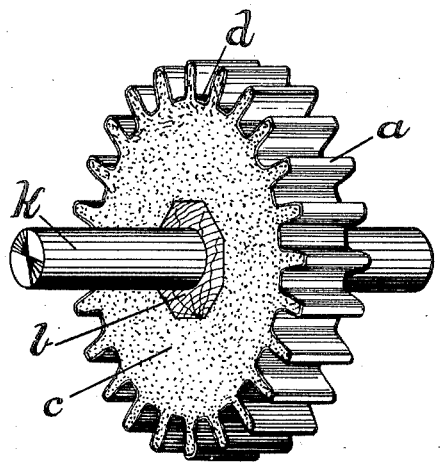
Fig 1.
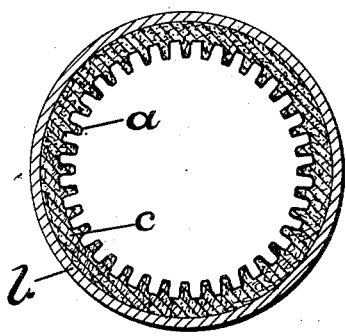
Fig 2.
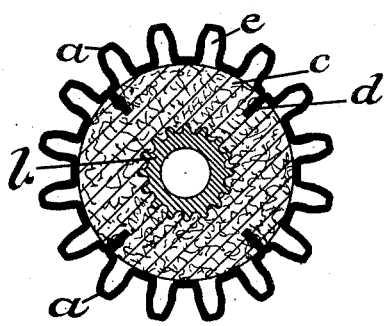
Fig 3.
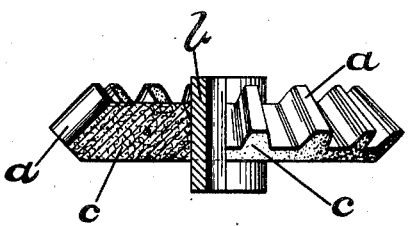
Witnesses: Fig 4.
Fig 5.
Inventor
Frederick Hutchins
By
James L. Norris
Atty No. 820,789. PATENTED MAY 15, 1906.
F. HUTCHINS.
FLEXIBLE TOOTHED ELEMENT.
APPLICATION FILED OCT. 30, 1905.

2 SHEETS—SHEET 2.

UNITED STATES PATENT OFFICE.

FREDERICK HUTCHINS, OF HARLESDEN, ENGLAND.

FLEXIBLE TOOTHED ELEMENT.

No. 820,789.　　　Specification of Letters Patent.　　　Patented May 15, 1906.

Application filed October 30, 1905. Serial No. 285,172.

*To all whom it may concern:*

Be it known that I, FREDERICK HUTCHINS, electrical engineer, a subject of the King of Great Britain, residing at Crescent Works, Harlesden, in the county of Middlesex, England, have invented certain new and useful Improvements in Flexible Toothed Elements, of which the following is a specification.

My invention relates to toothed elements known generally as "toothed" gearing—for instance, spur, bevel, and ratchet wheels. The invention also relates to corrugated or toothed elements used singly or with others.

My improved toothed element consists, primarily, of a ring or tube corrugated or fluted transversely, so as to form teeth of suitable pitch and shape mounted upon rubber or other more or less yielding or flexible material.

I prefer to make the fluted ring by passing a strip of thin sheet-steel through a pair of rollers, which flute it transversely of its length, a suitable length of the corrugated sheet strip so made having its ends then joined together, thus forming a fluted or corrugated tube having the external outline of an ordinary toothed gear-wheel. The ends of the strip may be joined together by brazing, electric welding, or by other means. If desired, the ring or tube may be hardened and tempered. Instead of making the fluted tube from a strip of fluted metal, I may take a tube already formed and flute it by drawing it through dies or by stamping the flutes one or more at a time.

The fluted ring or sheathing I mount upon a suitable hub or spindle, interposing between the sheathing and the hub or spindle a ring, tube, or disk, or more than one of these, or other suitable support made of rubber, cloth, leather, cork, paper, or other more or less yielding or flexible material. If the frictional grip of the corrugated ring or tube upon its support is not sufficient to prevent its slipping, the support may have projections or other means may be employed to give a positive drive. A convenient method of manufacture is to make the corrugated ring or tube as described above and fill it with or without pressure with a suitable material in a plastic state—such, for instance, as paperpulp or powdered cork mixed with a suitable binding agent.

If a non-metallic surface be required, this can be attained either by covering a fluted metal ring or tube made as described above with (say) skin, leather, parchment, paper, or other material suitably cemented to the base, or the metal may be omitted altogether and the fluted ring or tube itself may be made of vulcanized fiber, ebonite, or other non-metallic material.

It is obvious that the amount of resilience of the toothed element may be adjusted to almost any extent by altering the thickness and kind of material employed for the sheathing and for its support.

When the toothed elements are to be subjected to rough usage, and it is necessary to make the teeth exceptionally strong to resist damage, this may be accomplished by filling in the tooth with a suitable material—*e. g.*, compressed wood-pulp—thus producing what is practically a solid tooth, or the additional support may be obtained from a wire or rod of circular or other section held in place by suitable means.

In some kinds of machinery it is found advantageous to employ fluted elements in which the flutes are not parallel with the axis, but are helical or inclined to the axial line. It is clear that my improvements are applicable to the manufacture of such and of other kinds of gear-wheels and rollers, and, moreover, that the ribs or teeth may be of any required pitch or shape.

By the above-described method I also make crown, elliptical, helical-gear, scroll, ratchet, internal-gear, and other forms of gear-wheels by mounting a strip or ring of flexible teeth upon a suitably-shaped substantially solid elastic support.

Figure 7:
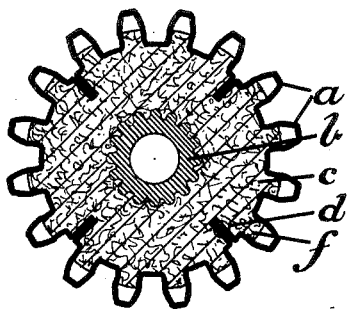
Figure 8:
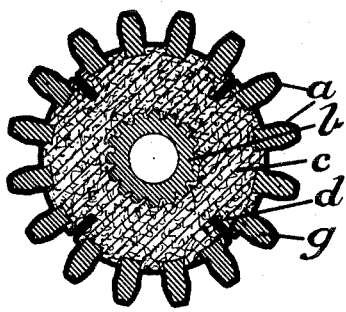

In the accompanying drawings, Figure 1 is a perspective view of a toothed wheel. Fig. 2 is a side view of an internally-toothed wheel. Fig. 3 is a modified form of a toothed element. Fig. 4 is a toothed element partly in section, and Fig. 5 is a fragmental view of a toothed element. Figs. 6, 7, and 8 are modifications.

In all the figures, *a* indicates the corrugated strip and *c* the flexible supporting material. The strip *a*, of, say, steel, is corrugated transversely either by passing it between corrugating-rollers or by stamping the corrugations one or more at a time. The two ends of this sheathing *a* may conveniently be joined together, as at *d*, by brazing or electric welding. Mounted on the spindle *k* is shown an octagonal wooden boss $b$, which, however, may be omitted. The intervening space $c$ between the central boss and the corrugated ring is filled with a resilient or elastic substance—such, for instance, as a mixture of paper-pulp and cork, with glue or caseine as a binding material, the corrugated ring $a$ forming the skin or contact-surface of the internal gear held in a rigid ring $b$ with an elastic composition $c$ interposed.

Fig. 3 shows a gear-wheel in which the corrugated sheathing $a$ is made in four sections, the ends of the sections being joined by rivets $d$. The boss or center $b$ may conveniently be made either of metal or wood with a fluted surface. The teeth of the wheel may be empty, as at $e$, or the flexible core $c$ may have projections $f$ partially filling them, or the teeth may be strengthened with rigid material $g$, such as metal strip, (here shown keyed into the flexible support $c$,) or the teeth may be filled with a material such as paper-pulp $h$, applied in a plastic or semiplastic condition.

The gear-wheels and rollers above described are cheaply and easily made, uniformity of tooth is secured, and, if made from polished sheet metal, the surface can be preserved in the tooth, so that the finished article may exhibit a surface superior to that produced by milling or planing from solid metal. Moreover, these gear-wheels have the very important advantage of possessing elasticity, thereby tending to deaden sound, reduce vibration, render the wheels less liable to damage from shocks, and greatly increase smoothness of running, besides which the working surfaces can be renewed at far less cost than in the case of solid wheels. Gear-wheels possessing flexibility are particularly useful for the speed-changing gear of motor-cars.

I claim—

1. A toothed element having a fluted covering, and a filling of elastic material.

2. A toothed element having a fluted covering of sheet material constituting teeth, and an elastic body for supporting the same.

3. A toothed element having an elastic body, and a sheathing surrounding the same, the latter forming teeth.

4. A toothed element having an elastic body, and a fluted covering surrounding the same and forming teeth.

5. A toothed element having an axial core of rigid material, a covering formed from sheet material and fluted, and an intervening filling of elastic material, the said flutes constituting teeth and supported by the axial core having the elastic body secured thereto.

6. A toothed element having an elastic body provided with a toothed periphery, and a covering correspondingly shaped to the periphery of the said body and secured thereto.

7. A toothed element having a yieldable body formed of resilient material and provided with a fluted periphery, and a covering for the periphery formed of sheet material.

8. A toothed element having a fluted portion constituting teeth, and an elastic body for supporting the same.

In testimony whereof I have hereunto set my hand in presence of two subscribing witnesses.

FREDERICK HUTCHINS.

Witnesses:
  ALFRED GEORGE BROOKES,
  ERNEST JOHN HILL.